(12) United States Patent
Huh

(10) Patent No.: US 7,411,571 B2
(45) Date of Patent: Aug. 12, 2008

(54) ORGANIC LIGHT EMITTING DISPLAY

(75) Inventor: Jin Huh, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 40 days.

(21) Appl. No.: 11/117,466

(22) Filed: Apr. 29, 2005

(65) Prior Publication Data
US 2006/0033449 A1 Feb. 16, 2006

(30) Foreign Application Priority Data
Aug. 13, 2004 (KR) .................. 10-2004-0063752

(51) Int. Cl.
G09G 3/30 (2006.01)
(52) U.S. Cl. .............. 345/80; 345/76; 345/82
(58) Field of Classification Search .............. 315/169.2, 315/169.3, 196.2; 345/55, 76, 77, 80, 84, 345/82
See application file for complete search history.

(56) References Cited

U.S. PATENT DOCUMENTS

| 6,919,871 B2* | 7/2005 | Kwon | 345/92 |
| 6,970,149 B2* | 11/2005 | Chung et al. | 345/82 |
| 7,173,582 B2* | 2/2007 | Nishitoba et al. | 345/76 |
| 2004/0070557 A1* | 4/2004 | Asano et al. | 345/76 |
| 2004/0217925 A1* | 11/2004 | Chung et al. | 345/76 |

* cited by examiner

Primary Examiner—Trinh Vo Dinh
Assistant Examiner—Dieu Hien T Duong
(74) Attorney, Agent, or Firm—Birch, Stewart, Kolasch & Birch, LLP

(57) ABSTRACT

An organic light emitting display that is capable of preventing degradation of picture quality, and a method of manufacturing the organic light emitting display are provided. A unit pixel for the organic light emitting display, includes a first transistor coupled to a data line and having a first voltage threshold, a second transistor coupled to the first and third transistors and controlled by a second select signal, a third transistor coupled to the first transistor and controlled by a first select signal, and a fourth transistor coupled to the third transistor and having a fourth voltage threshold such that a drive current of the fourth transistor is controlled independent of the fourth voltage threshold.

42 Claims, 17 Drawing Sheets

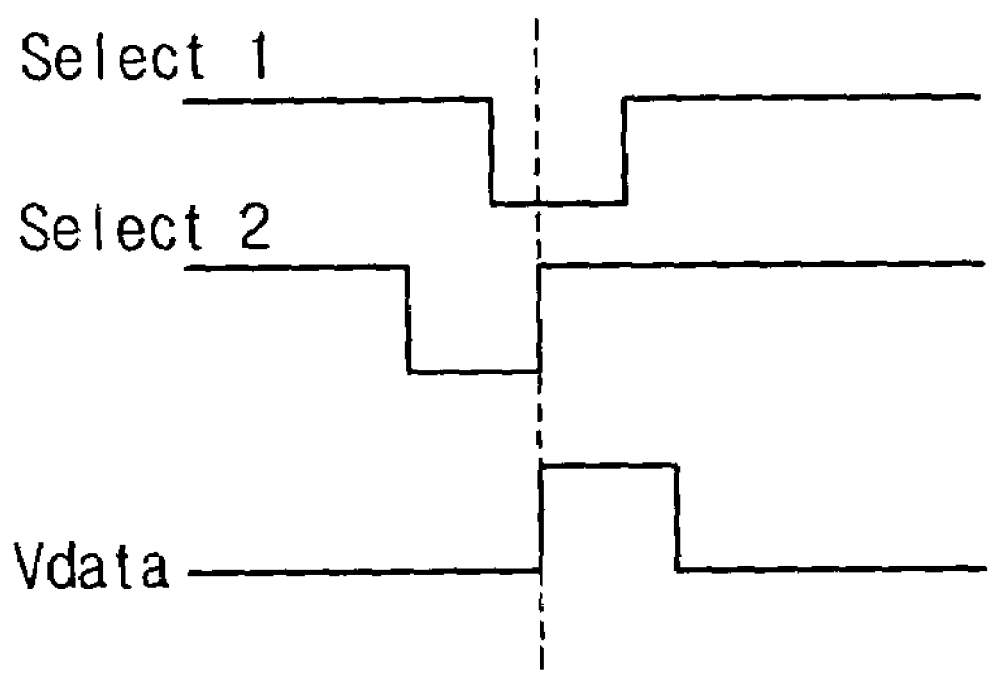

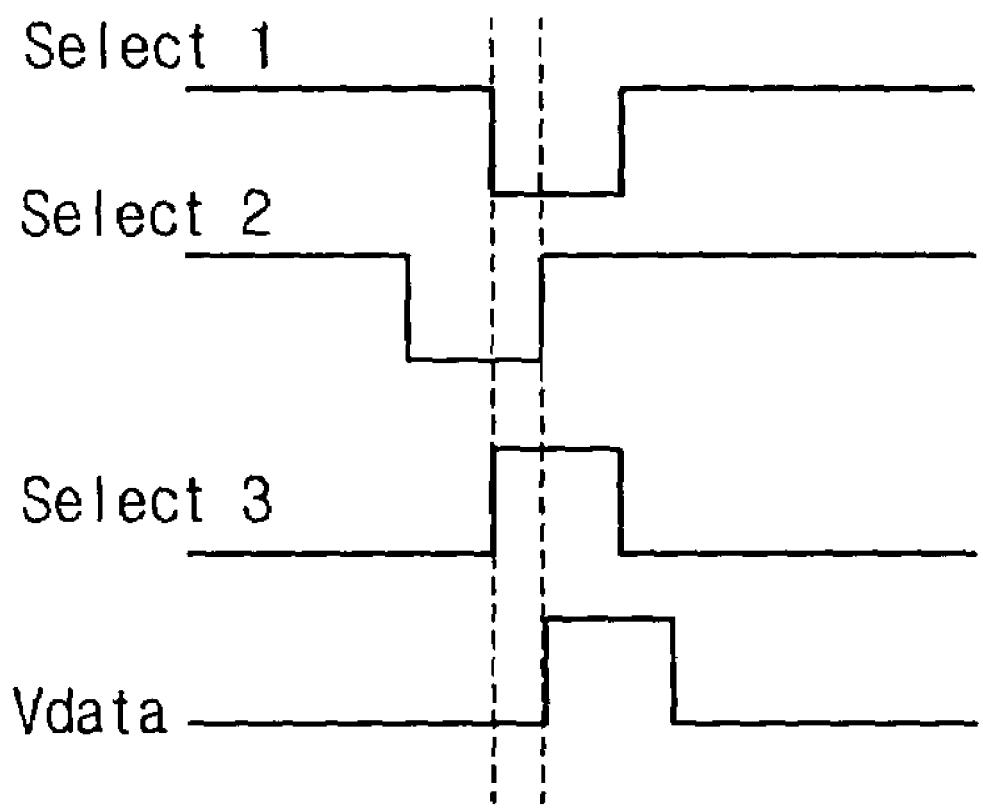

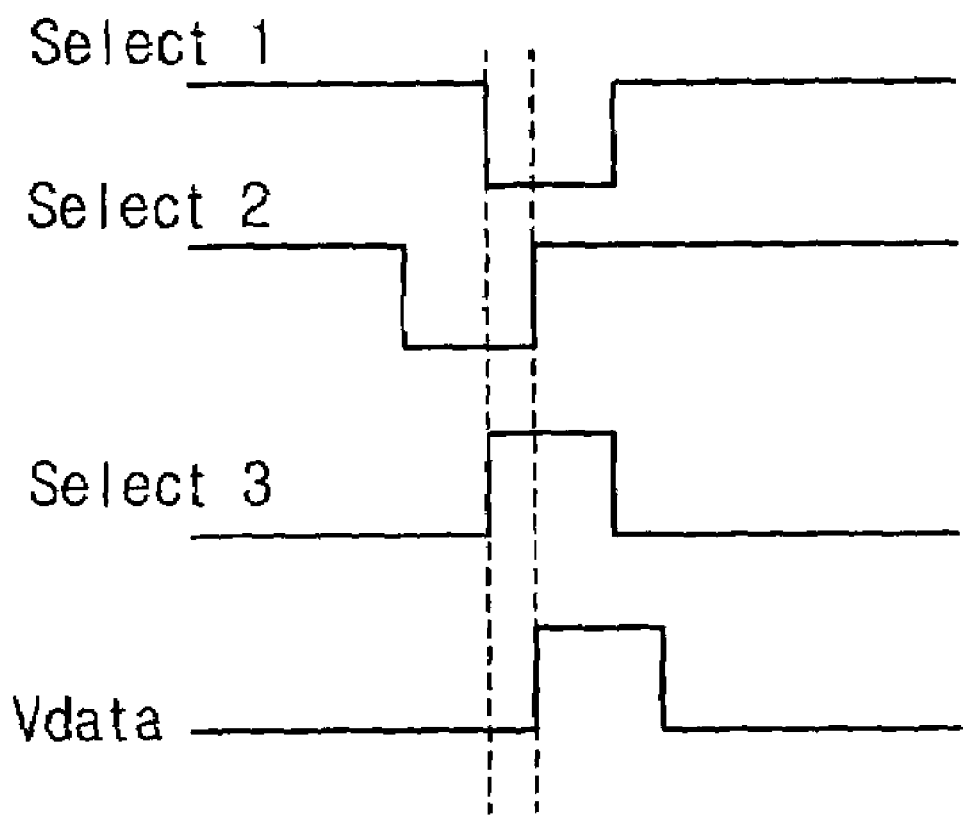

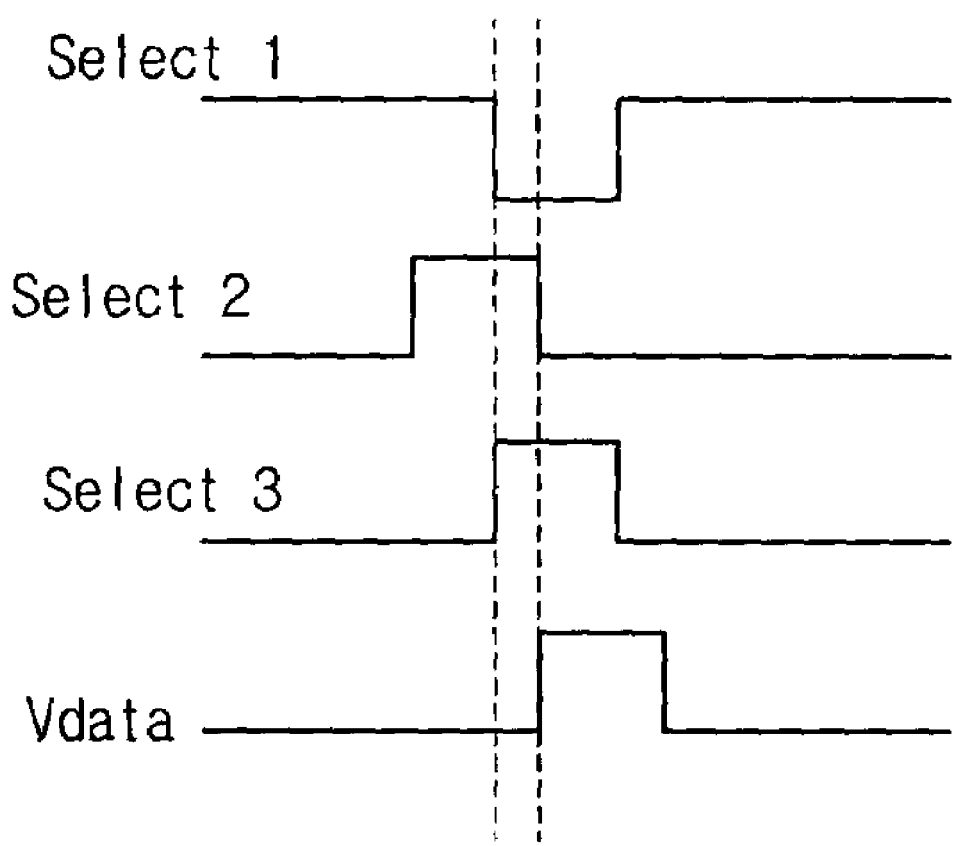

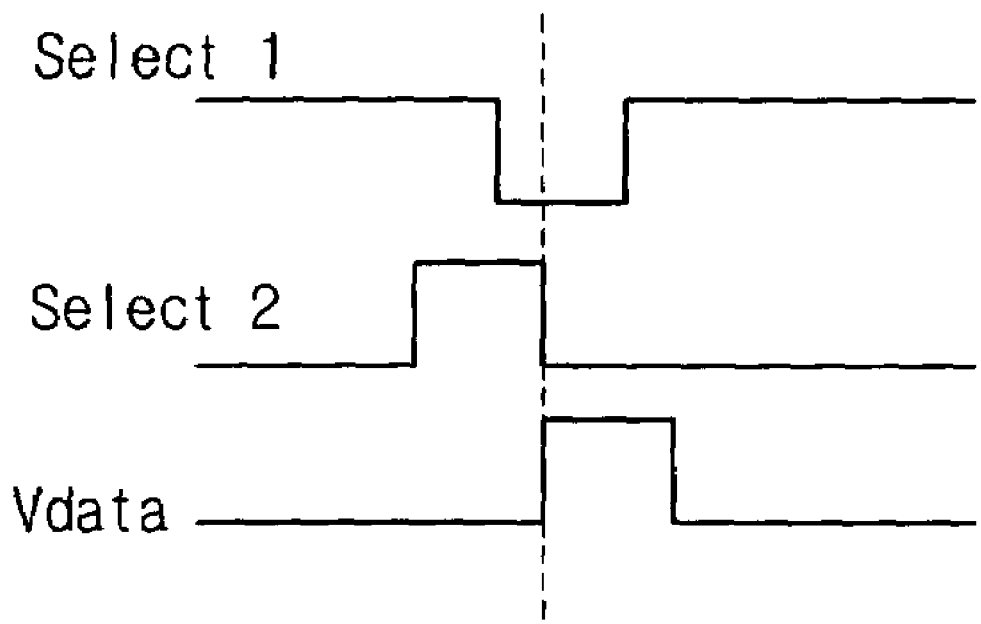

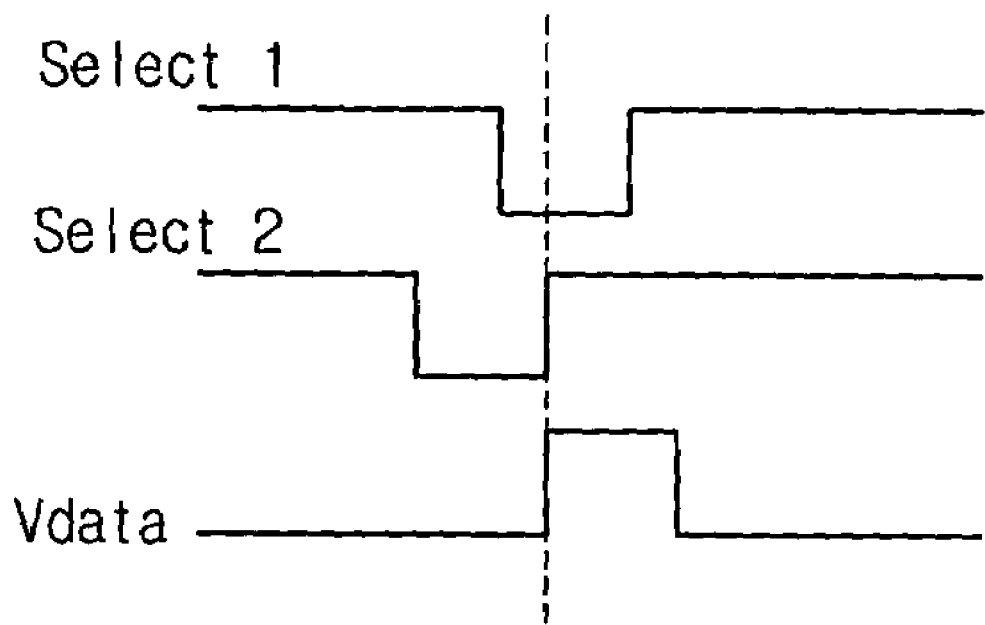

US 7,411,571 B2

ORGANIC LIGHT EMITTING DISPLAY

This application claims the priority benefit of the Korean Patent Application No. 10-2004-0063752 filed on Aug. 13, 2004, which is hereby incorporated by reference.

BACKGROUND OF THE INVENTION

1. Field of the Invention

The present invention relates to an organic light emitting display, and more particularly, to an organic light emitting display that can prevent degradation of picture quality and a method of manufacturing the organic light emitting display.

2. Description of the Related Art

An organic light emitting display is a self-luminous display that emits light by electrically exciting fluorescent organic compound, and displays an image by driving N×M organic light emitting diodes (OLEDs).

There are two driving methods for the organic light emitting display, that is, a passive matrix (PM) method and an active matrix (AM) method. In the case of the passive matrix method, anode electrodes and cathode electrodes are formed perpendicular to one another and the display is driven by selecting lines. In the case of the active matrix method, transistors and capacitors are connected to pixel electrodes formed of indium tin oxide (ITO) and the display is driven by maintaining a voltage due to the capacitance of the capacitor.

FIG. 1 is a circuit diagram of a unit pixel of a related art AM-type organic light emitting display.

Referring to FIG. 1, a second transistor T2 is connected to an OLED and supplies a driving current for light emission. An amount of the driving current of the second transistor T2 is controlled by a voltage applied through a first transistor T1. The first and second transistors T1 and T2 are PMOS transistors.

A capacitor C1 for maintaining a voltage during a predetermined period is connected between a source and a gate of the second transistor T2. The source of the second transistor T2 is connected to a power supply supplying a voltage VDD. A gate of the first transistor T1 is connected to a gate line GL and a select signal is supplied to the gate thereof. A source of the first transistor T1 is connected to a data line DL and a data voltage is supplied to the source thereof.

An operation of the organic light emitting display of FIG. 1 will be described below.

When the first transistor T1 is turned on in response to the select signal applied to the gate thereof, the data voltage is applied through the data line to the gate of the second transistor T2, that is, to a node X. Thus, the second transistor T2 is turned on and the OLED is driven by the driving current flowing through the turned-on second transistor T2.

The driving current (I) of the second transistor T2 is given by the following Equation 1, which is the same equation as for a general field effect transistor (FET).

$$I = K(V_{gs} - V_{th})^2 \text{ where} \qquad \text{(Equation 1)}$$

$$K = \frac{1}{2}\mu Cox\left(\frac{W}{L}\right)$$

where K is a constant, Vgs is a voltage between the gate and the source of the second transistor T2, Vth is a threshold voltage of the second transistor T2, μ is a mobility, Cox is an oxide capacitance, that is, a capacitance for a unit area of the gate of the second transistor T2, and W and L are respectively a width and a length of the channel of the second transistor T2.

Accordingly, the driving current (I) of the second transistor T2 is controlled by the voltage ($V_{gs}$) between the gate and the source of the second transistor T2 and the threshold of the second transistor T2. A brightness of the OLED is controlled by the driving current.

The AM-type organic light emitting display selects a desired pixel using the select signal and drives the OLED by the driving current that flows through the second transistor T2 due to the data voltage.

FIG. 2 is a view illustrating a process of manufacturing the related art organic light emitting display.

Referring to FIG. 2, an amorphous silicon (a-Si) thin film substrate is crystallized into a poly silicon (poly-Si) thin film substrate using a laser power of an Excimer laser. A quality of the poly-Si thin film substrate is determined by various parameters. Specifically, it is very sensitive to the laser power of the Excimer laser. That is, the intensity of the laser power is unstable depending on time and therefore the quality of the poly-Si thin film substrate becomes unstable.

The a-Si thin film substrate is crystallized into the poly-Si thin film substrate by scanning the a-Si thin film substrate with the laser in one direction (that is, scan direction). At this point, the quality of the poly-Si thin film substrate has a non-uniform characteristic in the scan direction and a uniform characteristic in a direction perpendicular to the scan direction.

As a result, if the poly-Si thin film substrate has the non-uniform characteristic, the threshold voltage ($V_{th}$) of the drive transistor (e.g., the second transistor T2 in FIG. 1) varies. Thus, all threshold voltages of drive transistors provided at each pixel become different, and driving currents flowing through the drive transistors become different. Consequently, a desired gray scale cannot be obtained.

If the poly-Si thin film substrate crystallized non-uniformly is driven in the manner discussed above, an image having striped patterns is displayed as shown in FIG. 3. This problem is caused by the change in the threshold voltage of each drive transistor in the non-uniformly crystallized substrate of the display.

SUMMARY OF THE INVENTION

Accordingly, the present invention is directed to an organic light emitting display and a method of manufacturing the organic light emitting display that substantially obviates one or more problems due to limitations and disadvantages of the related art.

An object of the present invention is to provide an organic light emitting display that is capable of preventing the degradation of picture quality, and a method of manufacturing the organic light emitting display.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a unit pixel for an organic light emitting display, the unit pixel comprising: first to fourth transistors; and a capacitor coupled to one of the first to fourth transistors, wherein two of the first to fourth transistors function as switching devices, one of the first to fourth transistors functions as a driving device, and one of the first to fourth transistors functions as a diode device.

In accordance with an aspect of the present invention, there is provided a unit pixel for an organic light emitting display, the unit pixel comprising: a first transistor coupled to a data line and having a first voltage threshold; a second transistor coupled to the first and third transistors and controlled by a second select signal; a third transistor coupled to the first transistor and controlled by a first select signal; and a fourth transistor coupled to the third transistor and having a fourth voltage threshold such that a drive current of the fourth transistor is controlled independent of the fourth voltage threshold.

In accordance with another aspect of the present invention, there is provided an organic light emitting display device comprising: a plurality of unit pixels, each unit pixel including a first transistor coupled to a data line and having a first voltage threshold, a second transistor coupled to the first and third transistors and controlled by a second select signal, a third transistor coupled to the first transistor and controlled by a first select signal, and a fourth transistor coupled to the third transistor and having a fourth voltage threshold such that a drive current of the fourth transistor is controlled independent of the fourth voltage threshold.

In accordance with a further another aspect of the present invention, there is provided a display device comprising: a first transistor connected to a first node to initialize the first node in response to a first select signal; a second transistor connected between the first node and a second node to initialize the second node in response to a second select signal; a third transistor connected to the first node to supply a data voltage to the second node, the data voltage being dropped as much as a first threshold voltage; and a fourth transistor connected to the second node to supply a driving current to an organic light emitting diode (OLED), the fourth transistor having a second threshold voltage to offset the first threshold voltage.

In accordance with a further another aspect of the present invention, there is provided a unit pixel for an organic light emitting display, the unit pixel comprising: a first component coupled to a data line; first and second select signal lines to supply respectively first and second select signals; a second component coupled to the first component and controlled by the second select signal; a third component coupled to the first component and controlled by the first select signal; and a fourth component coupled to the third component and supplying a driving current to an organic light emitting diode (OLED).

In accordance with a further another aspect of the present invention, there is provided a method of manufacturing an organic light emitting display device, the method comprising: forming an organic light emitting display panel including a plurality of unit pixels, each unit pixel including a first transistor coupled to a data line and having a first voltage threshold, a second transistor coupled to the first and third transistors and controlled by a second select signal, a third transistor coupled to the first transistor and controlled by a first select signal, and a fourth transistor coupled to the third transistor and having a fourth voltage threshold such that a drive current of the fourth transistor is controlled independent of the fourth voltage threshold.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A and 4B are respectively a circuit diagram and a driving waveform of a unit pixel in an AM-type organic light emitting display according to a first embodiment of the present invention;

FIGS. 5A and 5B are respectively a circuit diagram and a driving waveform of a unit pixel in an AM-type organic light emitting display according to a second embodiment of the present invention;

FIGS. 6A and 6B are respectively a circuit diagram and a driving waveform of a unit pixel in an AM-type organic light emitting display according to a third embodiment of the present invention;

FIGS. 7A and 7B are respectively a circuit diagram and a driving waveform of a unit pixel in an AM-type organic light emitting display according to a fourth embodiment of the present invention;

FIGS. 9A and 9B are respectively a circuit diagram and a driving waveform of a unit pixel in an AM-type organic light emitting display according to a sixth embodiment of the present invention; and FIGS. 10A and 10B are respectively a circuit diagram and a driving waveform of a unit pixel in an AM-type organic light emitting display according to a seventh embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
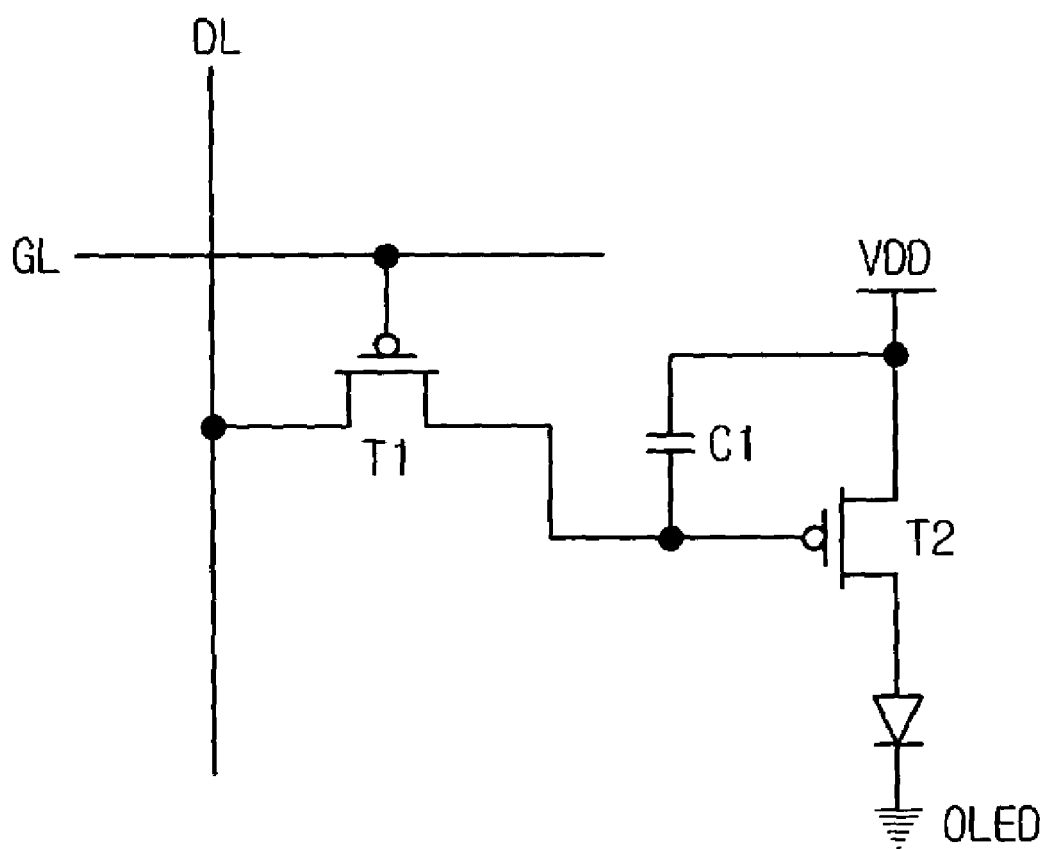
FIG. 1 is a circuit diagram of a unit pixel in a related art AM-type organic light emitting display.
Figure 2:
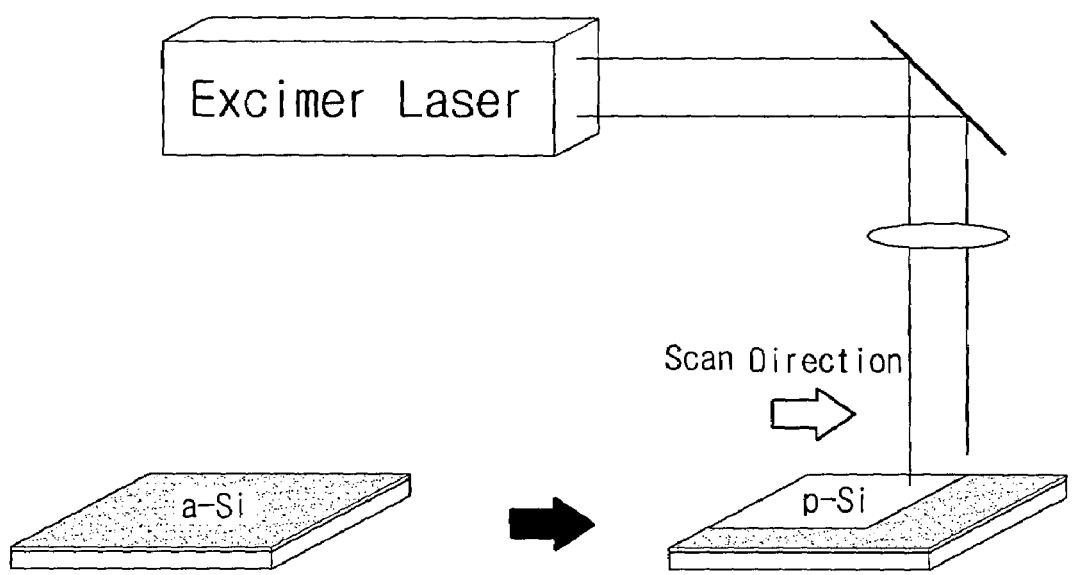
FIG. 2 is a view illustrating a process of manufacturing the related art organic light emitting display.
Figure 3:
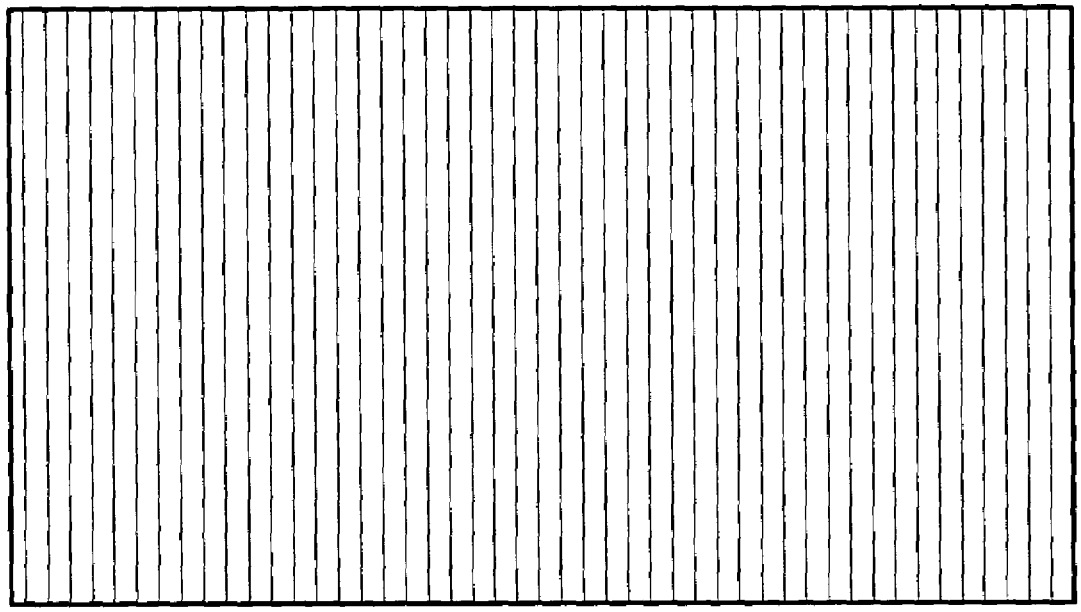
FIG. 3 is a view of striped patterns caused by a non-uniformly crystallized poly-Si thin film.
Figure 4A:
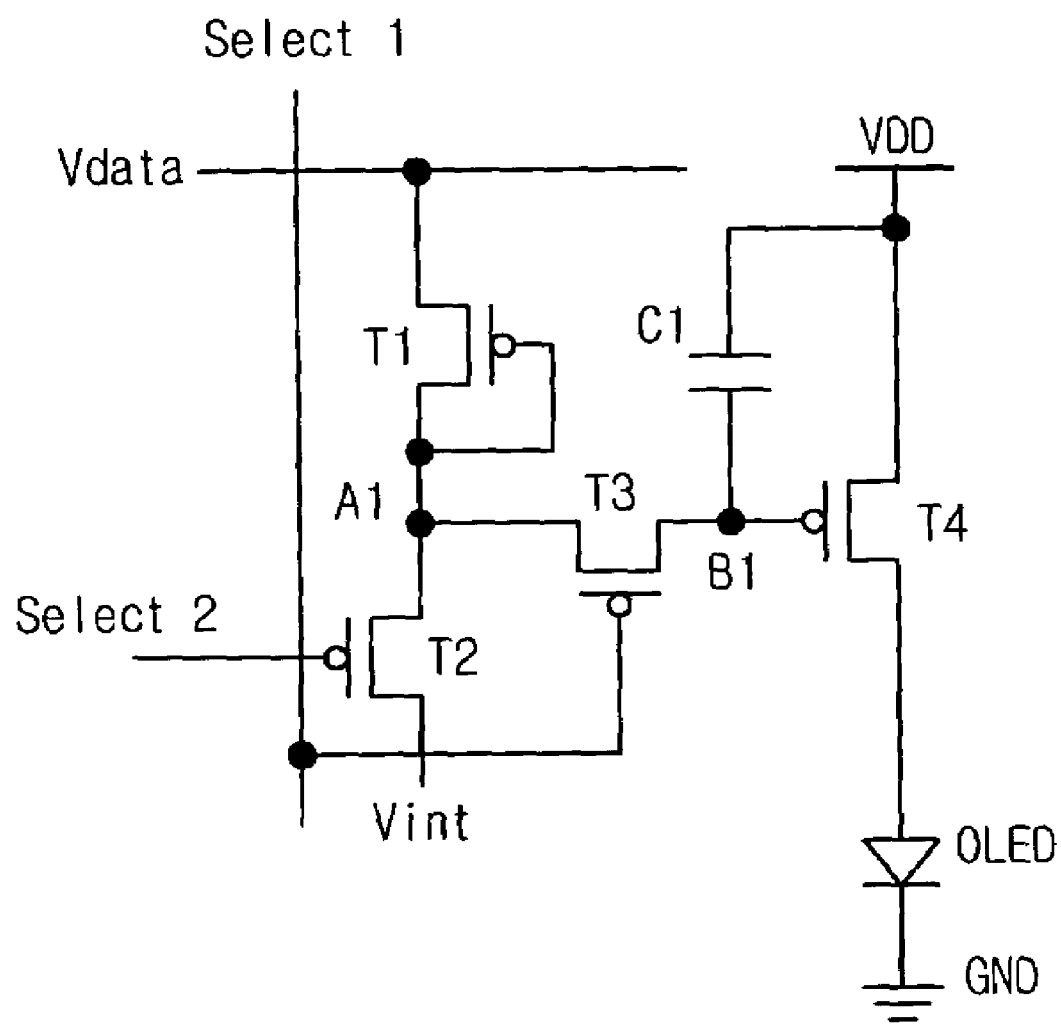

FIGS. 4A and 4B are respectively a circuit diagram and a driving waveform of a unit pixel in an AM-type organic light emitting display according to a first embodiment of the present invention. Although only a unit pixel is shown in these and subsequent figures, it is understood that an organic light emitting diode display device includes an OLED panel including a plurality of such unit pixels formed in a matrix configuration with a plurality of signal lines provided appropriately as discussed below.

Referring to FIGS. 4A and 4B, in the unit pixel of the organic light emitting display according to the first embodiment of the present invention, a first transistor T1 has a gate and a drain commonly connected to a first node A1 to thereby act as a diode, and a source connected to a data line supplying a data voltage Vdata. A second transistor T2 has a gate connected to a second select signal line supplying a second select signal Select2, a source connected to the first node A1, and a drain connected to an initialization voltage line supplying an initialization voltage Vint. A third transistor T3 has a gate connected to a first select signal line supplying a first select signal Select1, a source connected to the first node A1, and a drain connected to a second node B1. A fourth transistor T4 has a gate connected to the second node B1, a source connected to a power supply line supplying a power supply voltage VDD, and a drain connected to an OLED. Also, a capacitor C1 is connected between the second node B1 and the power supply voltage VDD. All the components of the unit pixel are operatively coupled.

Since the first transistor T1 has the diode function, it allows a driving current to flow in a forward direction, but not in a reverse direction. In addition, the first transistor T1 supplies a difference voltage between the data voltage Vdata and the threshold voltage of the first transistor T1 to the first node A1.

The second transistor T2 and the third transistor T3 have the switching function. That is, the second transistor T2 is turned on in response to the second select signal Select2 to supply the initialization signal Vint to the first node A1. The third transistor T3 is turned on in response to the first select signal Select1 to supply the voltage of the first node A1 to the second node B1. In this case, the capacitor C1 is charged to the difference voltage between the power supply voltage VDD and the voltage of the second node B1.

The fourth transistor T4 is a transistor for driving the OLED. When the capacitor C1 is turned on by the charged voltage, the driving current flows through the fourth transistor and causes the OLED to emit light.

In this embodiment, the first transistor T1 and the fourth transistor T4 are designed to have the identical crystal structure so as to make the threshold voltages Vth1 and Vth4 of the first and fourth transistor T1 and T4 identical to each other.

Since the threshold voltages Vth1 and Vth4 of the first and fourth transistors V1 and V4 are identical to each other, the driving current of the fourth transistor T4 is not influenced by the threshold voltage. Thus, the uniform brightness of each pixel is achieved, which prevents the degradation of picture quality occurring due to the non-uniformity in brightness.

The first to fourth transistors T1 to T4 are PMOS transistors.

An operation of the unit pixel of FIG. 4A in the organic light emitting display will be described above.

As shown in FIG. 4B, the second select signal Select2 has a low level pulse and the first select signal Select1 then has a low level pulse whose predetermined portion is overlapped with the second select signal Select2. The data voltage Vdata of a high level is generated in synchronization with a rising time of the second select signal Select2.

When the second transistor T2 is turned on in response to the second select signal Select2 of a low level, the initialization voltage Vint initializes the node A1 through the second transistor T2.

The third transistor T3 is turned on in response to the first select signal Select1 of the low level whose predetermined portion is overlapped with the second select signal Select2.

When the second and third transistors T2 and T3 are simultaneously maintained at the turned-on state by the first and second select signals Select1 and Select2, the initialization voltage Vint charged at the first node A1 is supplied to the second node B1 so that the second node B1 is initialized to the initialization voltage Vint.

When the third transistor T3 is in the turned-on state, the second transistor T2 is turned on in response to the second select signal Select2 and the data voltage Vdata is applied through the first transistor T1 at the same time.

Since the data voltage Vdata is dropped as much as the threshold voltage Vth1 of the first transistor T1 while passing through the first transistor T1, the difference voltage Vdata−Vth1 between the data voltage Vdata and the threshold voltage Vth1 of the first transistor T1 is charged at the first node A1.

The difference voltage Vdata−Vth1 charged at the first node A1 passes through the turned-on third transistor T3 and is charged at the second node B1.

In such a state, if the third transistor T3 is turned off in response to the first select signal Select1 of a high level, the second node B1 maintains the difference voltage Vdata−Vth1.

In this case, the gate-source voltage $V_{gs}$ of the fourth transistor T4 becomes a difference voltage VDD−(Vdata−Vth1) between the power supply voltage VDD and the difference voltage Vdata−Vth1. The difference voltage VDD−(Vdata−Vth1) is then charged at the capacitor C1 during one frame.

The driving current (I) flowing through the drain of the fourth transistor T4 is equally given by Equation 1 above, except that ($V_{gs}$−Vth) in Equation 1 can be expressed as:

$$V_{gs}-|Vth|=VDD-(Vdata-Vth1)-|Vth|.$$

In the poly-Si crystallization process, the first and fourth transistors T1 and T4 can have the identical threshold voltage by designing them to have the same crystallization direction. Thus, the threshold voltage Vth1 of the first transistor T1 becomes equal to the threshold voltage Vth4 of the fourth transistor T4.

Accordingly, the difference voltage between the gate-source voltage of the fourth transistor T4 and the threshold voltage Vth4 of the fourth transistor T4 becomes:

$$V_{gs}-Vth4=VDD-(Vdata-Vth1)-Vth4=VDD-Vdata$$
since Vth1=Vth4.

As seen from the above equation, since the driving current of the fourth transistor T4 is associated with only the data voltage Vdata and the power supply voltage VDD without regard to its threshold voltage, the driving current can be correctly controlled by the fourth transistor T4. Thus, the OLED can emit light by the driving current of the reliable fourth transistor T4, thereby obtaining desired brightness. Consequently, it is possible to prevent the degradation of picture quality that occurs due to the non-uniformity of the brightness.

Meanwhile, during the initialization operation, a high current flows through the OLED. In this case, a dark gray scale may be difficult to express and a contrast ratio may also be reduced.

Figure 5A:
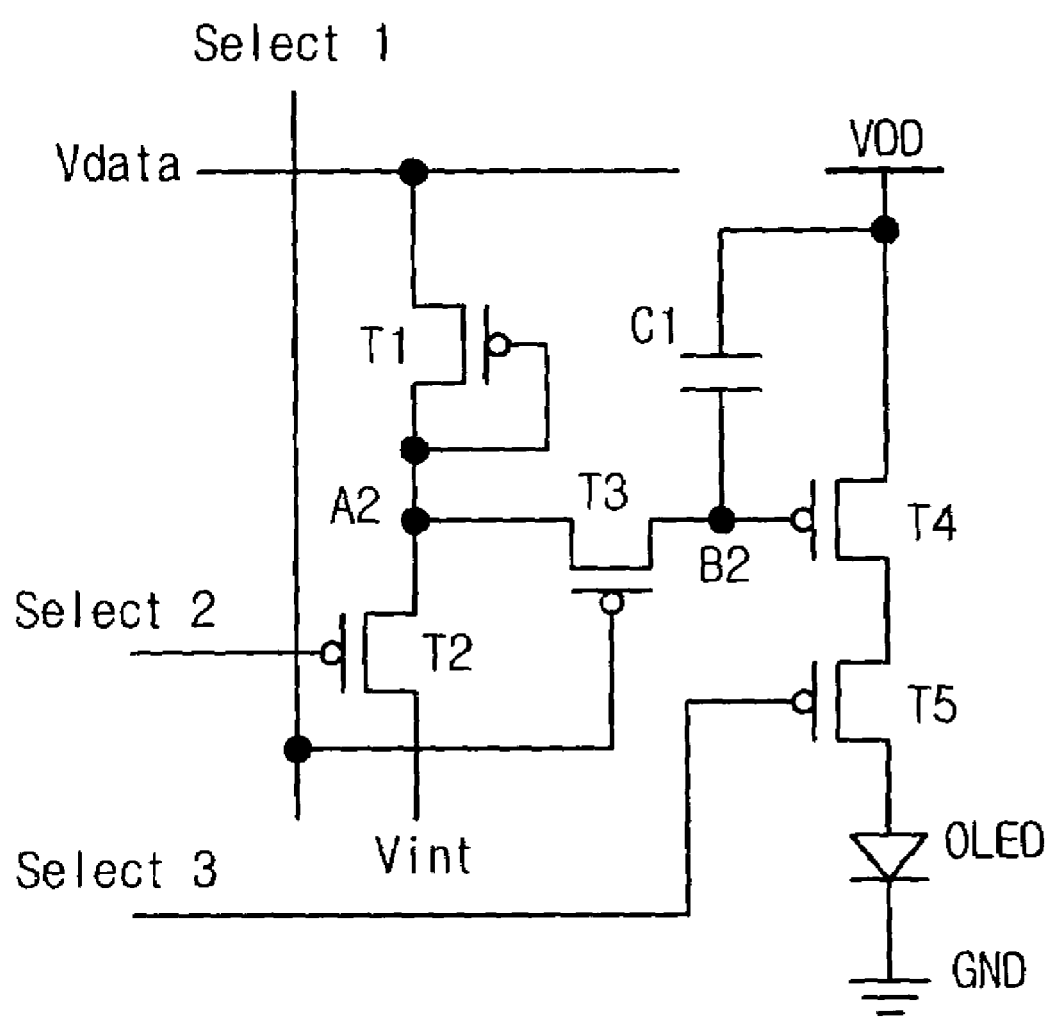

In order to address these concerns, a second embodiment is provided as shown in FIGS. 5A and 5B.

FIGS. 5A and 5B are respectively a circuit diagram and a driving waveform of a unit pixel in an AM-type organic light emitting display according to the second embodiment of the present invention. All the components of the unit pixel in FIG. 5A are operatively coupled.

The second embodiment is similar to the first embodiment. However, a difference is that the second embodiment further includes a fifth transistor T5. That is, the fifth transistor T5 is provided between the fourth transistor T4 and the OLED.

The fifth transistor T5 has a gate connected to a third select signal line supplying a third select signal Select3, a source connected to the drain of the fourth transistor T4, and a drain connected to the OLED.

In FIG. 5A, the first to fifth transistors T1 to T5 are PMOS transistors.

As shown in FIG. 5B, in order for the initialization, the third select signal Select3 connected to the fifth transistor T5 is set to a high level when the first select signal Select1 of a low level is applied to the third transistor T3. That is, in the initialization, the first select signal Select1 has a phase opposite to the third select signal Select3.

As in the first embodiment, in order for the driving current of the fourth transistor T4 not to be associated with the threshold voltage of the fourth transistor T4, in the second embodiment the first and fourth transistors T1 and T4 are designed to have the same crystallization direction so that the threshold voltage Vth1 of the first transistor T1 can be identical to the threshold voltage Vth4 of the fourth transistor T4.

An operation of the organic light emitting display of FIG. 5A according to the second embodiment of the present invention will be described below.

When the second transistor T2 is turned on in response to the second select signal Select2 of a low level, the initialization voltage Vint passes through the second transistor T2 and initializes the first node A2.

The third transistor T3 is turned on in response to the first select signal Select1 of a low level whose predetermined portion is overlapped with the second select signal Select2.

When the second and third transistors T2 and T3 are both turned on in response to the first and second select signals Select1 and Select2, the initialization signal Vint charged at the first node A2 is provided to the second node B2 and thus the second node B2 is initialized to the initialization voltage Vint.

When the third transistor T3 is turned on in response to the first select signal Select1 to initialize the second node B2, simultaneously the fifth transistor T5 is turned off in response to the third select signal Select3 of a high level, which has a phase opposite to the first select signal Select1. Accordingly, at that time the high current is prevented by the turned-off fifth transistor T5 from flowing through the OLED due to the initialization voltage that is applied to the second node B2 by the turned-on third transistor T3.

Meanwhile, while the third transistor T3 is turned on, the second transistor T2 is turned off in response to the second select signal Select2 of a high level and the data voltage Vdata is applied through the first transistor T1 at the same time.

Since the data voltage Vdata is dropped as much as the threshold voltage Vth1 of the first transistor T1 while passing through the first transistor T1, the difference voltage Vdata-Vth1 between the data voltage Vdata and the threshold voltage Vth1 of the first transistor T1 is charged at the first node A2.

The difference voltage Vdata-Vth1 charged at the first node A2 passes through the turned-on third transistor T3 and is charged at the second node B2.

In such a state, if the third transistor T3 is turned off in response to the first select signal Select1 of a high level, the second node B2 maintains the difference voltage Vdata-Vth1.

At this point, the third select signal Select3 whose phase is opposite to the first select signal Select1 has a low level, and the fifth transistor T5 is turned on in response to the third select signal Select3 of the low level.

Accordingly, when the second node B2 is initialized, the fifth transistor T5 is turned off so that the high current does not flow through the OLED and the OLED is not affected. Then, when the difference voltage Vdata-Vth1 between the data voltage Vdata and the threshold voltage Vth1 of the first transistor T1 is charged at the second node B2, the fifth transistor T5 is turned on so that the driving current of the fourth transistor T4 flows through the OLED.

In this case, the gate-source voltage $V_{gs}$ of the fourth transistor T4 becomes a difference voltage VDD-(Vdata-Vth1) between the power supply voltage VDD and the difference voltage Vdata-Vth1. The difference voltage VDD-(Vdata-Vth1) is charged at the capacitor C1 during one frame.

The driving current (I) flowing through the drain of the fourth transistor T4 is equally given by Equation 1 above, except that, ($V_{gs}$-Vth) in Equation 1 can be expressed as:

$$V_{gs} - |Vth| = VDD - (Vdata - Vth1) - |Vth|.$$

In the poly-Si crystallization process, the first and fourth transistors T1 and T4 can have the identical threshold voltage by designing them to have the same crystallization direction. Thus, the threshold voltage Vth1 of the first transistor T1 becomes equal to the threshold voltage Vth4 of the fourth transistor T4.

Accordingly, the difference voltage between the gate-source voltage of the fourth transistor T4 and the threshold voltage Vth4 of the fourth transistor T4 becomes:

$$V_{gs} - Vth4 = VDD - (Vdata - Vth1) - Vth4 = VDD - Vdata$$
since Vth1=Vth4.

Since the driving current of the fourth transistor T4 is associated with only the data voltage Vdata and the power supply voltage VDD without regard to its threshold voltage, the driving current can be correctly controlled by the fourth transistor T4. Thus, the OLED can emit light by the driving current of the reliable fourth transistor T4, thereby obtaining the desired brightness. Consequently, it is possible to prevent the degradation of picture quality that occurs due to the non-uniformity of the brightness.

Also, when the second node B2 is initialized, the high current is prevented from flowing through the OLED. This further improves the picture quality by allowing a dark gray scale to be expressed and by preventing reduction in contrast ratio.

Figure 6A:
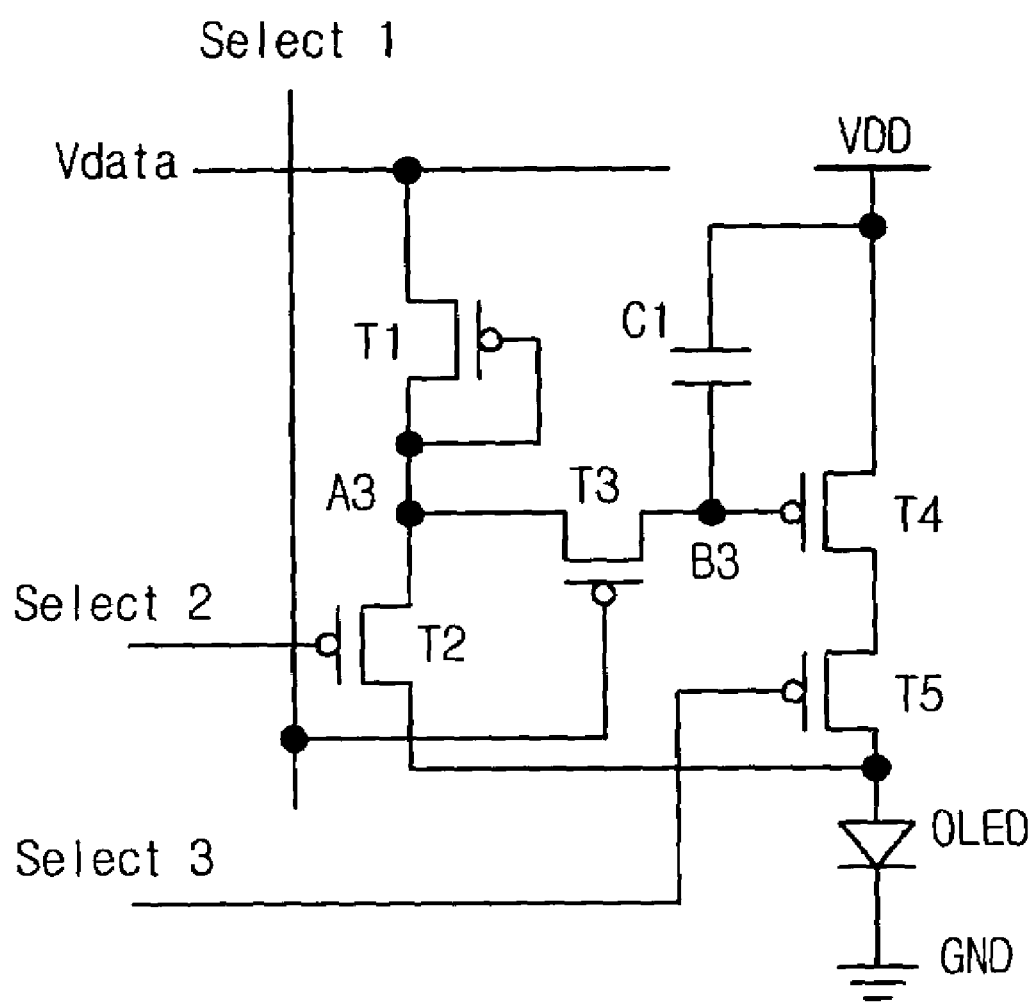

FIGS. 6A and 6B are respectively a circuit diagram and a driving waveform of a unit pixel in an AM-type organic light emitting display according to a third embodiment of the present invention. All the components of the unit pixel in FIG. 6A are operatively coupled.

Referring to FIGS. 6A and 6B, the third embodiment is similar to the second embodiment shown in FIG. 5A, but a difference is that the drain of the second transistor T2 is connected between the fifth transistor T5 and the OLED. Accordingly, the voltage remaining in the OLED can be used as the initialization voltage and no separate initialization voltage line and/or source is needed.

Since the basic operation of the third embodiment is the same as that of the second embodiment, the following description will be made to highlight the differences.

The second transistor T2 is turned on in response to the second select signal Select2 of a low level to initialize the unit pixel of the organic light emitting display. Therefore, a voltage remaining at the OLED initializes the first node A3 through the second transistor T2.

After initializing the first node A3, the second node B3 is also initialized and a difference voltage between the data voltage Vdata and the threshold voltage Vth1 of the first transistor T1 is charged at the second node B3 through the first transistor T1. Since the subsequent operation of the components of the unit pixel in the third embodiment is identical to that of the second embodiment, a detailed description thereof will be omitted.

In the third embodiment, the voltage remaining at the OLED of the unit pixel is used as the initialization voltage and thus there is no need to provide the initialization voltage line supplying the Vint separately. Thus, the circuit configuration of the unit pixel can be simplified and the number of signal lines can be reduced.

Figure 7A:
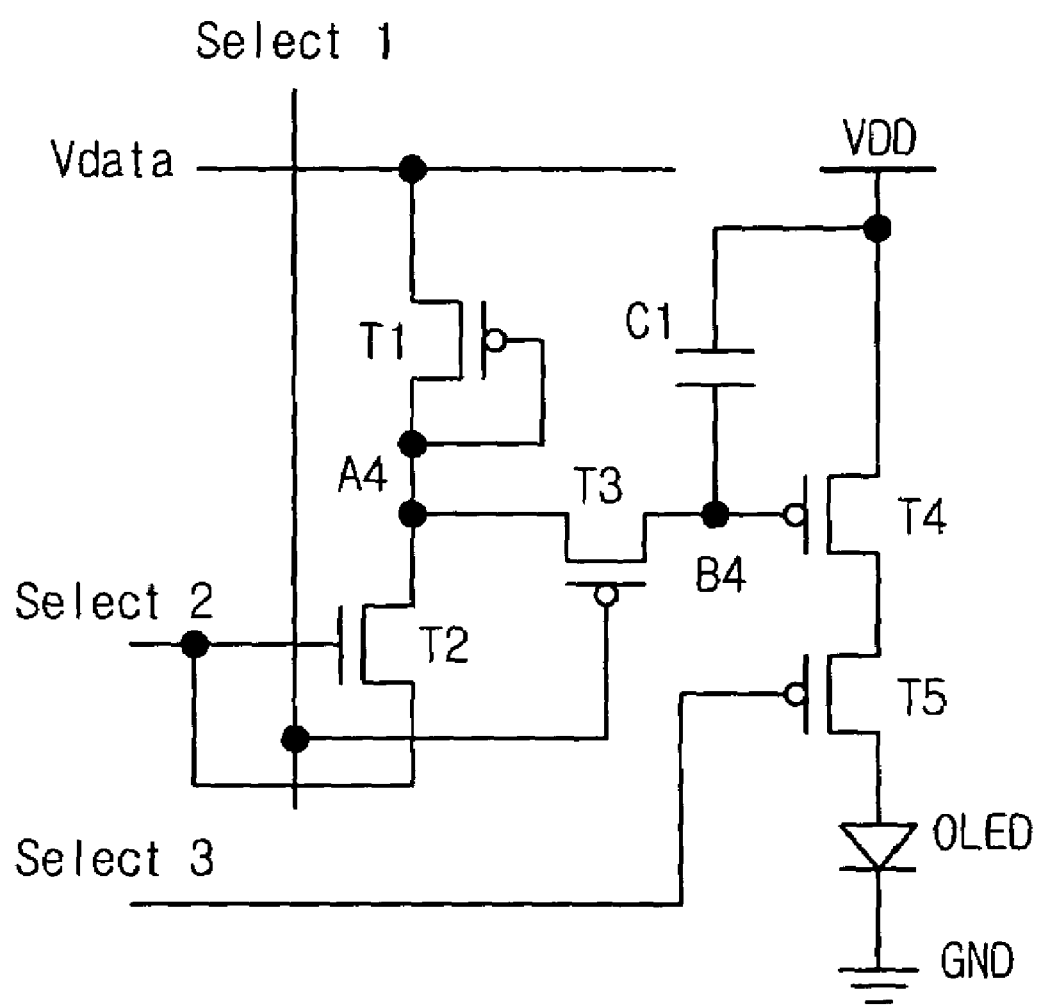

FIGS. 7A and 7B are respectively a circuit diagram and a driving waveform of a unit pixel in an AM-type organic light emitting display according to a fourth embodiment of the present invention. All the components of the unit pixel in FIG. 7A are operatively coupled.

Referring to FIGS. 7A and 7B, the fourth embodiment is similar to the second embodiment shown in FIG. 5A, but a difference is that the gate and drain of the second transistor T2 are commonly connected to the second select signal Select2, and no separate initialization voltage line/source supplying the Vint is provided. Accordingly, the second select signal Select2 can be used as the initialization voltage. Also, preferably, the second transistor T2 is an NMOS transistor that is turned on in response to the second select signal Select2 of a high level. Other transistors T1 and T3-T5 remain as PMOS transistors.

When the second select signal Select2 of a high level is applied, the second transistor T2 is turned on and the first node A4 is initialized by the second select signal Select2.

Since the basic operation of the fourth embodiment is the same as that of the second embodiment, the following description will be made to highlight the differences.

The second transistor T2 is turned on in response to the second select signal Select2 of a high level to initialize the unit pixel of the organic light emitting display.

Simultaneously, the second select signal Select2 of the high level is charged at the first node A4 through the second transistor T2 and thus the first node A4 is initialized.

Since the subsequent operation of the components of the unit pixel in the fourth embodiment is identical to that of the second embodiment, a detailed description thereof will be omitted.

In the fourth embodiment, the gate and drain of the second transistor T2 are commonly connected to the second select signal Select2. Accordingly, the second select signal Select2 can be used as the initialization voltage and no separate line/ source providing the initialization voltage is needed. Thus, the circuit configuration of the unit pixel can be simplified and the number of signal lines can be reduced.

Figure 8A:
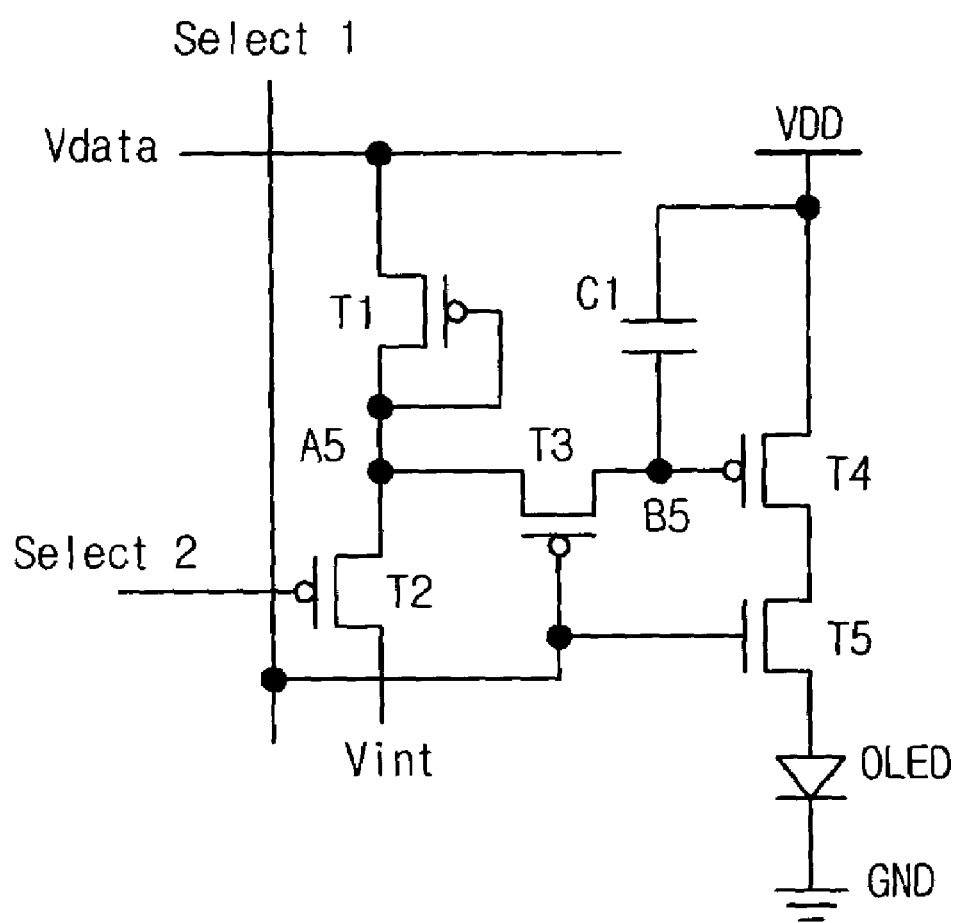
FIGS. 8A and 8B are respectively a circuit diagram and a driving waveform of a unit pixel in an AM-type organic light emitting display according to a fifth embodiment of the present invention.
Figure 8B:
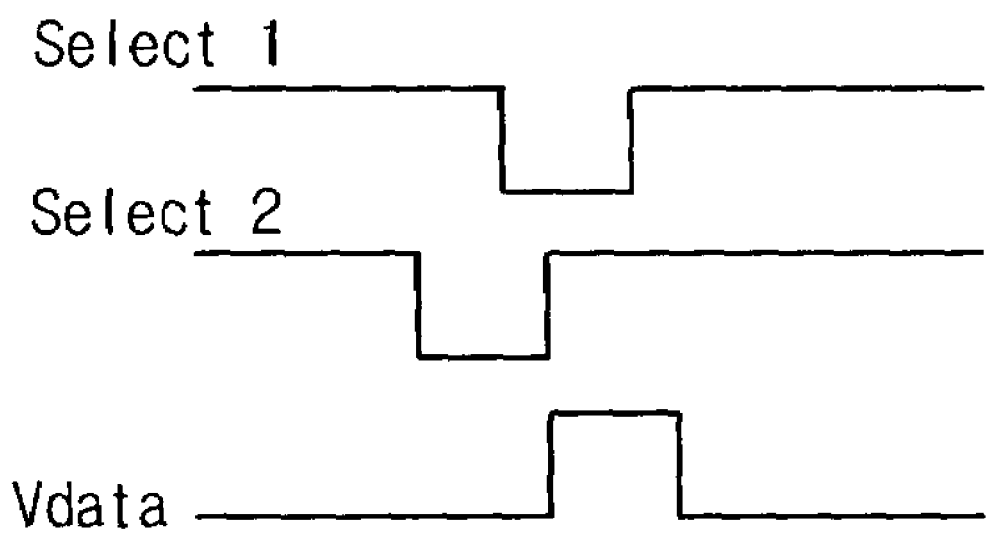

FIGS. 8A and 8B are respectively a circuit diagram and a driving waveform of a unit pixel in an AM-type organic light emitting display according to a fifth embodiment of the present invention. All the components of the unit pixel of FIG. 8A are operatively coupled.

Referring to FIGS. 8A and 8B, the fifth embodiment is similar to the second embodiment shown in FIG. 5A, but a difference is that the gate of the fifth transistor T5 is connected to the first select signal Select1, so that the fifth transistor T5 is turned off in response to the first select signal Select1 at the same time when the second node B5 is initialized through the third transistor T3 turned on in response to the first select signal Select1, thereby preventing the high current from flowing through the OLED. Since the fifth transistor T5 is controlled by the first select signal Select1, there is no need to provide a separate third select signal line providing a third select signal Select3.

Accordingly, the switching operations of the third and fifth transistors T3 and T5 can be simultaneously controlled by the first select signal Select1. In this case, the third transistor T3 and the fifth transistor T5 should be opposite type transistors. For example, if the third transistor T3 is a PMOS transistor, then the fifth transistor T5 is an NMOS transistor.

Since the subsequent operation of the components of the unit pixel in the fifth embodiment is identical to that of the second embodiment, a detailed description thereof will be omitted.

Figure 9A:
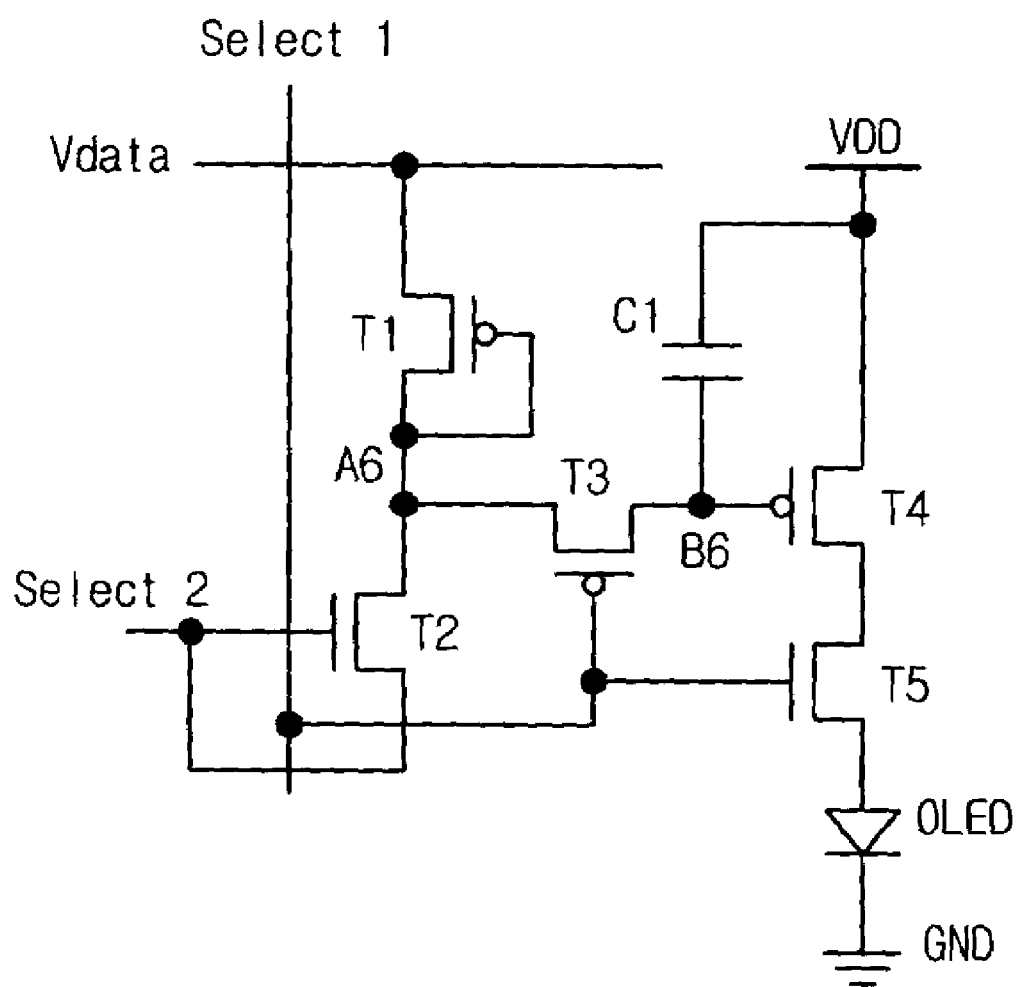

FIGS. 9A and 9B are respectively a circuit diagram and a driving waveform of a unit pixel in an AM-type organic light emitting display according to a sixth embodiment of the present invention. All the components of the unit pixel in FIG. 9A are operatively coupled.

Referring to FIGS. 9A and 9B, the sixth embodiment is similar to the second embodiment shown in FIG. 5A, but a difference is that the gate and drain of the second transistor T2 are commonly connected to the second select signal Select2 such that no separate initialization voltage line is needed and the second select signal Select2 is used as the initialization voltage when it is applied. In this regard, the second transistor is an NMOS transistor so that it is turned on when the second select signal Select2 is at a high level, which is then used as the initialization voltage. Also, by connecting the gate of the fifth transistor T5 to the first select signal Select1, the switching operations of the third and fifth transistors T3 and T5 are simultaneously controlled by the first select signal Select1, thereby preventing the high current from flowing through the OLED during the initialization operation. In this case, the transistor T3 and T5 are opposite type transistors. In this example, the transistors T3 and T5 are a PMOS transistor and an NMOS transistor, respectively. As such, no separate third select signal line is needed.

That is, in the sixth embodiment, the signal line for supplying the initialization voltage and the signal line for controlling the fifth transistor are not required. Thus, the number of signal lines can be reduced and the circuit configuration of the unit pixel can be simplified.

Figure 10A:
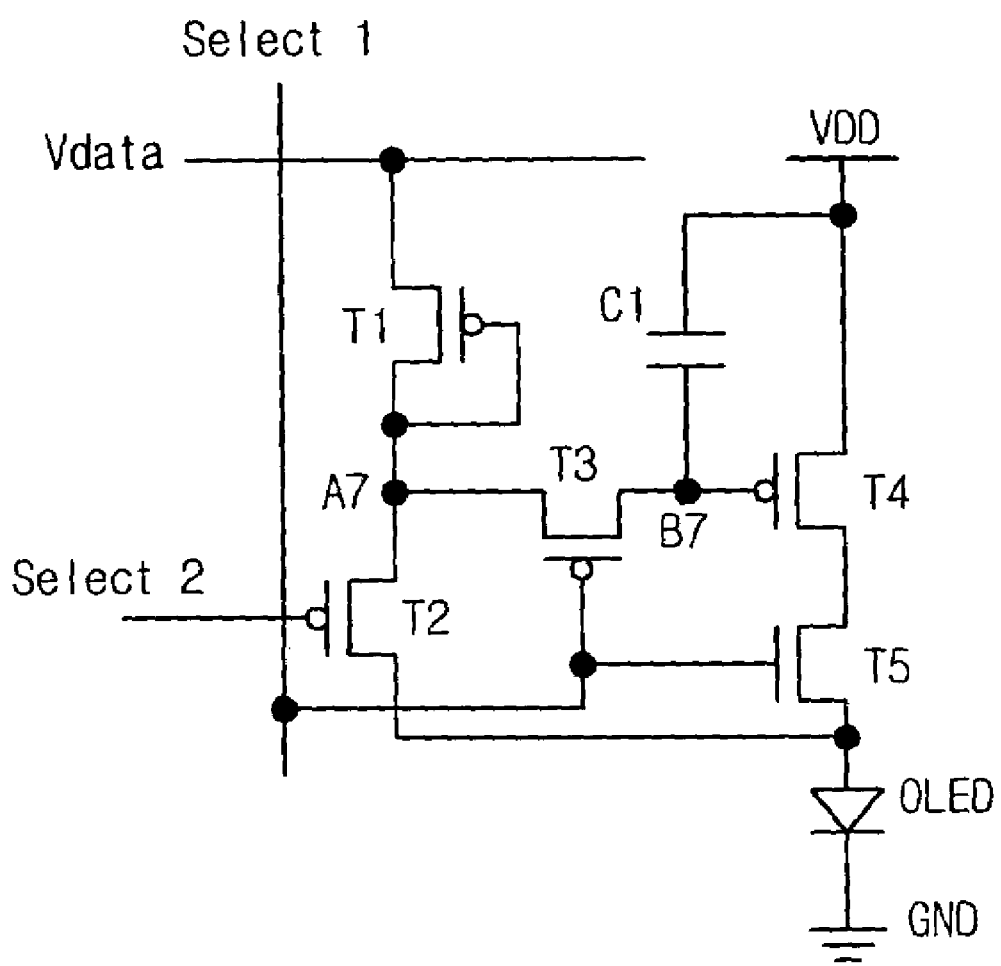

FIGS. 10A and 10B are respectively a circuit diagram and a driving waveform of a unit pixel in an AM-type organic light emitting display according to a seventh embodiment of the present invention. All the components of the unit pixel of FIG. 10A are operatively coupled.

Referring to FIGS. 10A and 10B, the seventh embodiment is similar to the second embodiment shown in FIG. 5A, but a difference is that the drain of the second transistor T2 is connected between the fifth transistor T5 and the OLED. Thus, the voltage remaining at the OLED is used as the initialization voltage during the initialization operation of the second transistor T2, and no separate initialization voltage line is needed. Also, by connecting the gate of the fifth transistor T5 to the first select signal Select1, the switching operations of the third and fifth transistors T3 and T5 are simultaneously controlled by the first select signals Select1, thereby preventing the high current from flowing through the OLED during the initialization operation. Thus, no separate third select signal line/source is needed. In this case, the third and fifth transistors T3 and T5 should be opposite type transistors because they should be switched opposite to each other, e.g., PMOS and NMOS transistors respectively.

More specifically, when the second transistor T2 is turned on in response to the second select signal Select2 of a low level for the initialization, the voltage remaining at the OLED is supplied to the first node A7 through the second transistor T2 to initialize the first node A7.

When the first select signal Select1 of the low level is applied, the third transistor T3 provided with the PMOS transistor is turned on in response to the first select signal Select1 of the low level and the fifth transistor T5 provided with the NMOS transistor is turned off at the same time. Accordingly, the second node B7 is initialized by the voltage of the first node A7, which flows through the third transistor T3, and the high current generated from the fourth transistor T4 is prevented from flowing through the OLED by the operation of the turned-off fifth transistor T5.

Since the subsequent operation of the components of the unit pixel in the seventh embodiment is identical to that of the second embodiment, a detailed description thereof will be omitted.

In the seventh embodiment, since the voltage remaining at the OLED is used as the initialization voltage, a separate initialization voltage line and/or source is not required and thus power consumption can be reduced. Further, since the switching operations of the third and fifth transistors T3 and T5 are simultaneously controlled by the first select signal Select1, the number of the signal lines can be reduced and the circuit configuration of the unit pixel can be simplified.

In the various embodiments of the present invention, the data lines in parallel cross perpendicularly the first select signal lines in parallel, with the second and/or third select signal lines present in some embodiments being disposed in parallel with the data lines as shown in the figures. However, the present invention is not limited to this arrangement of the signal lines, and encompass other suitable arrangements of the signal lines.

Although the specific type of the transistors in each of the unit pixels of the display is described above, other types of transistors or switching devices can be used as long as they can achieve the operations and effects discussed above. For instance, wherever the use of PMOS transistors is discussed, NMOS transistors can be used instead, and wherever the use of NMOS transistors is discussed, PMOS transistors can be used instead.

Further, according to the method of manufacturing an OLED in the present invention, existing techniques are used to manufacture the OLED having the unit pixels discussed above.

As described above, the driving current of the drive transistor is not affected by the threshold voltage of the transistor, thereby preventing degradation in picture quality by addressing the non-uniformity of brightness, which is caused by the non-uniformity of threshold voltages in the transistors.

Further, the number of the signal lines can be reduced as discussed in the various embodiments, and thus the circuit configuration of the unit pixel can be simplified.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A unit pixel for an organic light emitting display, the unit pixel comprising:
   first to fourth transistors;
   a capacitor coupled to one of the first to fourth transistors,
   wherein two of the first to fourth transistors function as switching devices, one of the first to fourth transistors functions as a driving device, and one of the first to fourth transistors functions as a diode device, and
   wherein the one transistor functioning as the diode device is connected directly to a data line, but not directly to a scan line; an organic light emitting diode (OLED); and a fifth transistor connected between the fourth transistor and the OLED to prevent a current from the fourth transistor from flowing to the OLED during an initialization.

2. A unit pixel for an organic light emitting display, the unit pixel comprising:
   a first transistor coupled to a data line and having a first voltage threshold;
   a second transistor coupled to the first transistor and a third transistor and controlled by a second select signal;
   the third transistor coupled to the first transistor and controlled by a first select signal;
   a fourth transistor coupled to the third transistor and having a fourth voltage threshold,
   wherein a drive current of the fourth transistor is controlled independent of the fourth voltage threshold, and
   wherein the first transistor functions as a diode device and is connected directly to a data line; an organic light emitting diode (OLED); and a fifth transistor connected between the fourth transistor and the OLED to prevent a current from the fourth transistor from flowing to the OLED during an initialization.

3. The unit pixel of claim 2, wherein the first voltage threshold is equal to the fourth voltage threshold.

4. The unit pixel of claim 2, further comprising:
   first and second select signal lines respectively supplying the first and second select signals.

5. The unit pixel of claim 2, further comprising:
   an initialization voltage line supplying an initialization voltage to the second transistor.

6. The unit pixel of claim 2, wherein the fifth transistor is controlled by a third select signal.

7. The unit pixel of claim 2, wherein a voltage from the OLED functions as an initialization voltage for the second transistor.

8. The unit pixel of claim 2, wherein the second select signal functions as an initialization voltage for the second transistor.

9. The unit pixel of claim 2, wherein the first select signal controls both the third and fifth transistors.

10. The unit pixel of claim 9, wherein the second select signal functions as an initialization voltage for the second transistor.

11. The unit pixel of claim 9, wherein a voltage from the OLED functions as an initialization voltage for the second transistor.

12. The unit pixel of claim 2, wherein the first through fifth transistors are of the same type.

13. The unit pixel of claim 2, wherein the third and fifth transistors are opposite type transistors.

14. The unit pixel of claim 2, wherein at least the second and the fifth transistors are of a type that is opposite to a type of the first, third or fourth transistor.

15. The unit pixel of claim 2, further comprising:
   a capacitor coupled between the third transistor and a power voltage source.

16. An organic light emitting display device comprising:
   a plurality of unit pixels, each unit pixel including,
   a first transistor coupled to a data line and having a first voltage threshold,
   a second transistor coupled to the first transistor and a third transistor and controlled by a second select signal,
   the third transistor coupled to the first transistor and controlled by a first select signal,
   a fourth transistor coupled to the third transistor and having a fourth voltage threshold,
   wherein a drive current of the fourth transistor is controlled independent of the fourth voltage threshold, and
   wherein the first transistor functions as a diode device and is connected directly to a data line, an organic light emitting diode (OLED), and a fifth transistor connected between the fourth transistor and the OLED to prevent a current from the fourth transistor from flowing to the OLED during an initialization.

17. The display device of claim 16, wherein for the each unit pixel, the first voltage threshold is equal to the fourth voltage threshold.

18. The display device of claim 16, wherein for the each unit pixel, the fifth transistor is controlled by a third select signal.

19. The display device of claim 16, wherein for the each unit pixel, a voltage from the OLED functions as an initialization voltage for the second transistor.

20. The display device of claim 16, wherein for the each unit pixel, the second select signal functions as an initialization voltage for the second transistor.

21. The display device of claim 16, wherein for the each unit pixel, the first select signal controls both the third and fifth transistors.

22. The display device of claim 21, wherein for the each unit pixel, the second select signal functions as an initialization voltage for the second transistor.

23. The display device of claim 21, wherein for the each unit pixel, a voltage from the OLED functions as an initialization voltage for the second transistor.

24. A display device comprising:
a first transistor connected to a first node to initialize the first node in response to a first select signal, the first transistor having a first threshold voltage;
a second transistor connected between the first node and a second node to initialize the second node in response to a second select signal;
a third transistor connected to the first node to supply a data voltage to the second node, the data voltage being dropped as much as the first threshold voltage;
a fourth transistor connected to the second node to supply a driving current to an organic light emitting diode (OLED), the fourth transistor having a second threshold voltage to offset the first threshold voltage,
wherein the first threshold voltage of the first transistor is identical to the second threshold voltage of the fourth transistor, and
the first transistor functions as a diode device and is connected directly to a data line; and a fifth transistor connected between the fourth transistor and the OLED to prevent a current from the fourth transistor from flowing to the OLED during an initialization operation.

25. The display device of claim 24, wherein the fifth transistor connected between the fourth transistor and the OLED blocks the current supplied from the fourth transistor to the OLED during an initialization operation in response to the first select signal.

26. A unit pixel for an organic light emitting display, the unit pixel comprising:
a first component coupled to a data line;
first and second select signal lines to supply respectively first and second select signals;
a second component coupled to the first component and controlled by the second select signal;
a third component coupled to the first component and controlled by the first select signal;
a fourth component coupled to the third component and supplying a driving current to an organic light emitting diode (OLED),
wherein the first component is connected directly to the data line, but not directly to any of the first and second select signal lines; and a fifth component connected between the fourth component and the OLED to prevent a current from the fourth component from flowing to the OLED during an initialization operation.

27. The unit pixel of claim 26, wherein the first, second, third and fourth components are transistors.

28. The unit pixel of claim 26, wherein the fifth component is controlled by either the first select signal or a third select signal and prevents a current flow to the OLED during an initialization of the third component.

29. A method of manufacturing an organic light emitting display device, the method comprising:
forming an organic light emitting display panel including a plurality of unit pixels, each unit pixel including,
a first transistor coupled to a data line and having a first voltage threshold,
a second transistor coupled to the first transistor and a third transistors and controlled by a second select signal,
the third transistor coupled to the first transistor and controlled by a first select signal,
a fourth transistor coupled to the third transistor and having a fourth voltage threshold such that a drive current of the fourth transistor is controlled independent of the fourth voltage threshold, wherein the first transistor functions as a diode device and is connected directly to a data line, an organic light emitting diode (OLED), and a fifth transistor connected between the fourth transistor and the OLED to prevent a current from the fourth transistor from flowing to the OLED during an initialization operation.

30. The method of claim 29, wherein the first voltage threshold is equal to the fourth voltage threshold.

31. The method of claim 29, further comprising:
forming first and second select signal lines for each of the unit pixels to respectively supply the first and second select signals.

32. The method of claim 29, further comprising:
forming an initialization voltage line to supply an initialization voltage to the second transistor in each of the unit pixels.

33. The method of claim 29, wherein for each of the unit pixels, the fifth transistor is controlled by a third select signal.

34. The method of claim 29, wherein for each of the unit pixels, a voltage from the OLED functions as an initialization voltage for the second transistor.

35. The method of claim 29, wherein for each of the unit pixels, the second select signal functions as an initialization voltage for the second transistor.

36. The method of claim 29, wherein for each of the unit pixels, the first select signal controls both the third and fifth transistors.

37. The method of claim 36, wherein for each of the unit pixels, the second select signal functions as an initialization voltage for the second transistor.

38. The method of claim 36, wherein for each of the unit pixels, a voltage from the OLED functions as an initialization voltage for the second transistor.

39. The method of claim 29, wherein for each of the unit pixels, the first through fifth transistors are of the same type.

40. The method of claim 29, wherein for each of the unit pixels, the third and fifth transistors are opposite type transistors.

41. The method of claim 29, wherein for each of the unit pixels, at least the second and the fifth transistors are of a type that is opposite to a type of the first, third or fourth transistor.

42. The method of claim 29, further comprising:
forming, in each of the unit pixels, a capacitor coupled between the third transistor and a power voltage source.

* * * * *